March 14, 1967
O. J. KLENE
3,308,775
SEED VALVE
Filed March 1, 1965
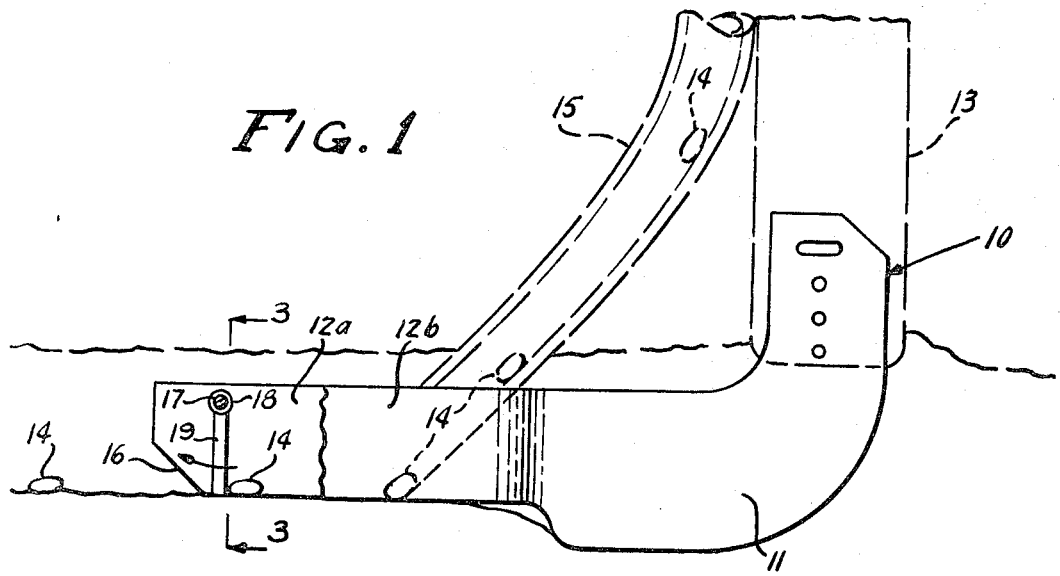
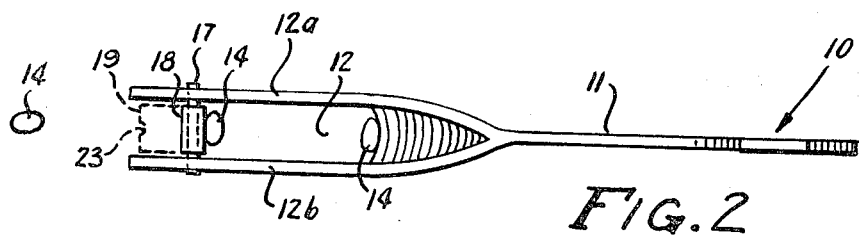
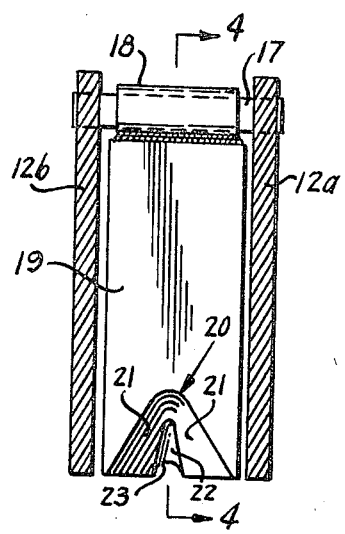 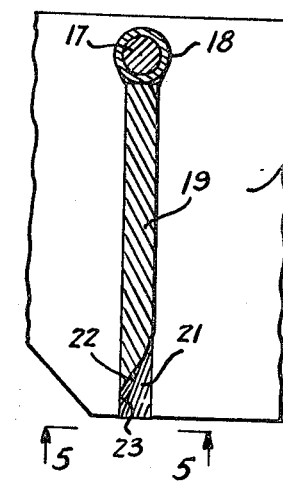 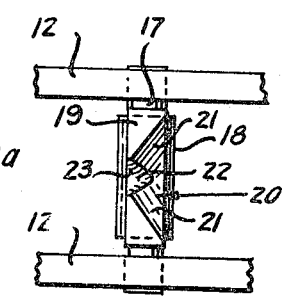
FIG.3   FIG.4
INVENTOR.
ORVILLE J. KLENE
BY Kimmel, Crowell & Weaver
ATTORNEYS.

United States Patent Office 3,308,775
Patented Mar. 14, 1967

3,308,775
SEED VALVE
Orville J. Klene, R.R. 5, Greensburg, Ind. 47240
Filed Mar. 1, 1965, Ser. No. 435,854
7 Claims. (Cl. 111—86)

This invention relates to a seed valve, and more particularly to such a valve adapted to be associated with a planter.

A primary object of this invention is the provision of layer of soil so that the seed can pass through and be planters such, for example, as corn planters wherein a seed-dispensing apparatus ejects seed into the furrow opener enclosure at a relatively high speed and wherein location of the seed in the row is not critical.

As conducive to a clear understanding of this invention it may here be pointed out that the conventional furrow opening tool or runner severs the harrowed or loose upper layer of soil so that the seed can pass through and be deposited on a more dense moisture-laden layer. The conventional runner is also provided with a keel which produces a slit below the center of the furrow. In thick clays and gumbo type soils seed falling in this slit are the only seeds which germinate. In soils which are in good planting condition seeds bounce in the furrow and upon being deprived of contact with the dense lower layer, as by a loose fragment of soil, are retarded in the process of germination as the soil dries, the resultant plants thus being weaker and often susceptible to disease or insect damage. An important object of the instant yieldable or non-rigid seed valve is, therefore, to avoid the occurrence of such conditions by increasing the peak efficiency range of the planter when operating in varying soil conditions.

A further object of the invention is the provision of a yieldable non-rigid seed valve placed at the exit of the runner chamber whereby the seed may establish immediate contact with available soil moisture, this being effected by the retention of the seed within the runner chamber until it is settled into the most favorable position for rapid and uninterrupted germination, or centered in the slit formed at the center of the furrow by the keel of the runner.

An additional object of the invention is, by means of a valve as mentioned above and to be hereinafter described in detail, the provision of extremely accurate control of plant population, with a minimum seed requirement, as well as the insurance of adequate planting and conditions where the soil is too dry or too coarse.

A further and more specific object of the invention is the provision of a yieldable or non-rigid seed valve of this nature which is positioned at the rear of the runner chamber, and which is pivotally mounted loosely within the chamber, with the lower end of the valve even with the lower end of the chamber walls, and the side having a clearance therefrom, so that the valve will swing freely under all conditions of soil.

An additional object of the invention is, by the provision of such a valve having a tapered exit hole, to retain the seed within the runner chamber until it is lodged in the most favorable position for quick and uninterrupted germination, at which time the seed is passed from the guide or under the valve.

Still another object of the invention is the provision of such a valve which will not clog regardless of the conditions of the soil in which it is operated, and which is substantially trouble-free in operation.

Other objects reside in the combinations of elements, arrangements of parts, and features of construction, all as will be more fully pointed out hereinafter and shown in the accompanying drawing wherein there is disclosed a preferred embodiment of this inventive concept.

In the drawings:

FIGURE 1 is a side elevational view of a furrow opening tool or runner, shown in association with a seed planter mechanism and support therefor, the latter being indicated in dotted lines;

FIGURE 2 is a top plan view of the runner per se disassociated from its related mechanism;

FIGURE 3 is an enlarged sectional view taken substantially along the line 3—3 of FIGURE 1 as viewed in the direction indicated by the arrows;

FIGURE 4 is a sectional view taken substantially along the line 4—4 of FIGURE 3 as viewed in the direction indicated by the arrows; and FIGURE 5 is a fragmentary bottom plan view taken substantially along the line 5—5 of FIGURE 4 as viewed in the direction indicated by the arrows.

Similar reference characters refer to similar parts throughout the several views of the drawing.

Having reference now to the drawings in detail, there is generally indicated at 10 a furrow opening tool of any desired conventional type which is provided with a keel 11 and a furrow opening chamber 12. The runner is adapted to be secured to any suitable support 13, such as a shank depending from a tractor or other planter mechanism, and seed 14 is adapted to be fed intermittently into the runner chamber 12 through a tube 15, the latter forming no part of the instant invention.

The runner chamber 12 is defined by a pair of substantially identical side walls 12a and 12b, which terminate in cutaway rear extremities 16, the chamber being normally opened or closed by a rigid valve assembly. In accordance with the instant invention, a retaining pin 17 is extended across the top of the walls 12a and 12b at a point adjacent the rear end thereof, and immediately adjacent the lower portion of the cutaway ends 16. Pin 17 supports a sleeve 18, which is integrally affixed to a valve plate 19, the sleeve being of larger diameter than the pin to afford free yieldable swinging movement thereabout, a diameter of approximately 5/64 of an inch larger than the retaining pin having been found satisfactory for this purpose. The valve plate 19 terminates at its lower extremity at a point even with the bottoms of side walls 12a and 12b, and is provided with adequate clearance from the side walls 12a and 12b, so that it may swing freely when the apparatus is in use. The overall clearance between the side walls may be in the nature of 5/32 of an inch, although variations are permissible so long as adequate clearance is provided. At the lower end of the gate is a V-shaped seed guiding slot, generally indicated at 20, and provided with rearwardly tapering side walls 21, which terminate in a rearwardly tapered declivity 22 which has in turn a relatively small orifice 23 at the bottom thereof.

In the use and operation of the device, a seed moves rearwardly along the bottom of the seed chamber defined by the walls 12a and 12b until it lodges in the V-shaped notch 20 in valve plate 19. As the runner slides over the dense moisture-laden under layer of soil with a moderate downward pressure, the seed moves with the valve a short distance along the furrow and the central slit thereof, until the seed lodges in this adhesive product, and overcomes the gravity force of the valve, the seed thus and then releasing itself from the runner chamber. Due to the yieldability of the valve there is no tendency to clog the runner chamber with soil, and after the seed has been released the valve immediately returns to its previous position ready for the reception of the next seed.

The weight of the valve plate should be appoximately 3½ ounces, and when fitted and dimensioned as described heretofore it will be found to be extremely efficient, reliable, non-clogging, and trouble-free.

From the foregoing it will now be seen that there is herein provided an improved seed valve which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In combination with a furrow opening tool, including a blade having a forward end and a rear end, a keel beneath said blade, and side walls defining a hollow open-ended seed chamber at the rear end of said blade, a seed valve, comprising a relatively flat plate having a seed guiding notch at its lower end, and means pivoting said valve at the upper rear end of said seed chamber, normally closing the open end thereof.

2. The structure of claim 1 wherein said valve plate includes a barrel at its upper end, and a hinge pin extending between the side walls of said chamber, extending through said barrel.

3. The structure of claim 2 wherein said plate extends to a point aligned with the bottom of said side walls.

4. The structure of claim 3 wherein said barrel is of a diameter in excess of that of said pin whereby free rotation of said valve plate is assured.

5. The structure of claim 4 wherein said valve plate is of a width less than the distance between said side walls, to provide clearance between the edges of said plate and said side walls.

6. The structure of claim 5 wherein said notch is substantially V-shaped and tapers rearwardly from the front of said valve plate.

7. The structure of claim 1 wherein said notch also tapers upwardly from the bottom of said plate.

References Cited by the Examiner

UNITED STATES PATENTS 2,554,205  5/1951  Oehler _____ 111—85
2,872,883  2/1959  Padrick _____ 111—86

ABRAHAM G. STONE, *Primary Examiner.*

A. E. KOPECKI, *Assistant Examiner.*